United States Patent [19]
Carpenter et al.

[11] 3,879,370
[45] Apr. 22, 1975

[54] FISH PRODUCT PREPARED BY DECOLORIZING FISH WITH ALKALINE HYDROPEROXIDE AND THEN DEODORIZING BY ISOPROPANOL EXTRACTION

[75] Inventors: Roland Paul Carpenter, Aberdeen; George Main, Portlethen; Anthony Hubert Sutton, Stonehaven, all of Scotland

[73] Assignee: Lever Brothers Company, New York, N.Y.

[22] Filed: Nov. 2, 1972

[21] Appl. No.: 303,175

[30] Foreign Application Priority Data
Nov. 10, 1971 United Kingdom............... 52153/71

[52] U.S. Cl............... 260/112 R; 426/364; 426/376; 426/429
[51] Int. Cl. .............................................. A23j 1/04
[58] Field of Search ................................. 260/112 R

[56] References Cited
UNITED STATES PATENTS

| | | | |
|---|---|---|---|
| 2,813,027 | 11/1957 | Galliver et al. ...................... | 99/111 |
| 2,972,542 | 2/1961 | Levin .......................... | 260/112 R X |
| 3,126,324 | 3/1964 | Mitz et al. .................... | 260/112 R X |
| 3,164,471 | 1/1965 | Whaley et al. ............... | 260/112 R X |
| 3,252,962 | 5/1966 | Whaley et al. .................. | 260/112 R |
| 3,707,381 | 12/1972 | Sharp .......................... | 260/112 R X |
| 3,759,716 | 9/1973 | Schulman et al. .......... | 260/112 R X |

FOREIGN PATENTS OR APPLICATIONS

| | | |
|---|---|---|
| 663,556 | 5/1963 | Canada |
| 1,155,047 | 9/1966 | United Kingdom |

OTHER PUBLICATIONS

Chem. Abstracts, Vol. 51, 18375a–b, Inagaki et al., 1957.
Merck Index, 1968, pp. 105, 218, 966.
Chem. Abstracts, Vol. 71, 1969, 79878q, Drozdowski et al.
Food Engineering, August, 1970, Lawler, pp. 61–65.
Chem. Abstracts, Vol. 75, 1971, 34248a, Kato, October, 1970.
J. of Food Science, Vol. 37, May–June, 1972, Rasekh et al., pp. 423–425.
Chem. Abstracts, Vol. 77, 1972, 18404j, Krassowska, March, 1972.

*Primary Examiner*—Howard E. Schain
*Attorney, Agent, or Firm*—Brumbaugh, Graves, Donohue & Raymond

[57] ABSTRACT

Protein is isolated from raw fish by decolorising it under mild conditions using, for example, hydrogen peroxide and by deodorising it by extraction with isopropanol. The protein isolate so obtained can then be dried to an essentially white powder of high nutritional value.

6 Claims, No Drawings

FISH PRODUCT PREPARED BY DECOLORIZING FISH WITH ALKALINE HYDROPEROXIDE AND THEN DEODORIZING BY ISOPROPANOL EXTRACTION

The invention relates to a protein isolate derived from fish and to a process for the separation of an isolate of protein from fish, particularly from fish waste.

Despite the large quantity of nutritious protein that is potentially obtainable from fish and marine animals, relatively few species have been exploited commercially as a source of human foods. Even for these species, a substantial proportion of the available protein is discarded during processing to be used as animal feedstuffs or as fertilisers. This low level of human utilisation stems partly from poor filleting techniques, and partly from the inability to isolate protein from fish waste in a form which is acceptable in terms of appearance and nutritional value as an ingredient of human foods.

The commercial unacceptability of fish protein isolates prepared by known methods is, further, reflected by the lack of commercial incentive to develop acceptable food products from it in the light of a chronic world shortage of protein foods.

A technique for the preparation of protein products from fish material was described in 1959 by Vogel and Mohler in U.S. Pat. No. 2,875,061; their method included solubilising fish protein with boiling alkali and then reprecipitating it with acid. The process also included fat extraction using an organic solvent. It is clear in the light of subsequent experience that not only would the nutritional value of the protein be severely diminished by such drastic alkali treatment, but that the colour of the end product would not be white enough to enable it to be used in the simulation of fish.

During the subsequent decade, other methods for isolating protein from fish were proposed. One of the more important of these was that described by Libenson and Pirosky in 1968 in British Pat. No. 1,108,188, which involves solubilising protein by treatment with an alkali under conditions which appear less severe than those of Vogel and Mohler, the resulting acid precipitated protein isolate being deodorised with alkaline hydrogen peroxide. It is evident, however, that as with the Vogel and Mohler process, the nutritional value of the Libenson and Pirosky product would have been adversely affected by the treatment with alkali.

We have now discovered that it is possible to prepare from fish and from fish waste, a protein isolate which is of acceptable white colour and which has a higher nutritional value than that prepared by known alkali solubilisation techniques. The secret of our method lies in the provision of raw fish which is decolorised under mild conditions and deodorised to form a protein isolate.

According to our invention, we provide a process for isolating protein from fish, in which the fish is treated with a decolorising agent under conditions such that the fish protein remains substantially undissolved and is deodorised by extraction with isopropanol.

The fish which forms the starting material of the process can be whole fish, but in order to ensure efficient decoloration and deodorisation, it is usual to subdivide the fish, for example by mincing or by milling it.

However, where existing legislation dictates that the fluoride level of a human foodstuff should be kept below the statutory minimum, it is necessary to remove most of the bone from the fish, since the fluoride content of bone is unacceptably high. In this case, it is preferable first to remove bone, either by filleting whole fish or by mechanical sieving of finely divided fish, before application of the decolorising and deodorising agents.

While the best quality products are obtained from filleted fish, the principal raw material for the present process is, for economic reasons, the waste material generated during the filleting of eviscerated fish. This waste material comprises fish frames, heads and trimmings, containing appreciable quantities of highly nutritious flesh which remains attached to the skeleton and bones. This raw material is valuable in that it forms a substantial part of the main catch in conventional wet fish operations, and yet commands only a low commercial value when used for example as an animal feedstuff, on account of its high content of bone and fats, its poor colour and its limited storage potential. In upgrading this waste material to produce a protein product acceptable for human consumption, it is necessary to remove most of the fat to ensure stability against oxidative deterioration during storage and subsequent processing, and to decolorise the fish muscle in order to generate a material of acceptable appearance.

Except where the presence of bone in the product is acceptable or where it can be readily separated from fish as in a simple filleting operation, mechanical rather than chemical methods of bone removal form an essential part of the present process, since these methods permit bone removal without recourse to extremes of pH or temperature, and can be followed by relatively mild reaction conditions for decoloration and deodorisation, thereby ensuring that the high nutritional quality of the protein which can be expressed for example in terms of the protein efficiency ratio, is retained.

In practice, we have found that the protein efficiency ratio of our products is not substantially less than that of casein as a standard and is in many cases greater than that of casein. Comparative tests on protein isolates derived by chemical solubilised protein, such as is described by Vogel and Mohler and by Libenson and Pirosky showed a consistent lowering of protein efficiency ratio to values well below that of the casein standard.

Several suitable mechanical methods of achieving this separation are known and generally rely on pressing the flesh through perforations in a rotating drum, whilst leaving the bone behind. It is usual, for efficient operation, to ensure that the raw fish material is first coarsely comminuted before passing it through a mechanical separator.

Particularly suitable machines for bone separation are those manufactured by Baader and by Bibun for the separation of bone and other hard inedible material from meat of all types. It is to be understood, however, that the scope of the present invention is not limited to the use of machines made only by these manufacturers.

The fish obtained after removal of substantially all of the bone will usually be in the form of a wet paste or slurry of finely divided fish muscle.

According to a preferred procedure to be described in detail later in this specification, it has been found most convenient first to decolorise the fish and then to deodorise it by solvent extraction, but it will be appreciated that it is possible to deodorise before decolorising or to carry out these two process steps simultaneously. However, for reasons of clarity of description and with no intention to limit the scope of the invention, the decolorising and deodorising process steps will be described in the sequence and manner that has been found preferable for reasons of both efficiency and economy.

The fish can be decolorised at neutral or mildly acid or mildly alkaline pH, that is at a pH value usually between 6.0 and 10.0, without impairing the high nutritional quality of the protein. It is possible to employ a pH value of greater than 10.0, but this may lead to impairment of the nutritional value of the protein isolate.

One example of a suitable decolorising agent is hydrogen peroxide and this can be employed under several differing process conditions.

In a particularly preferred process, hydrogen peroxide as the decolorising agent is used under mildly alkaline conditions. In this case, it is usual to treat raw fish with a hydroxide such as sodium hydroxide so as to adjust the pH to a value not greater than 9.5. The mildly alkaline fish is then stirred or otherwise agitated with hydrogen peroxide at a temperature of from 30 – 70°C, preferably 40°-60°C, until decolorisation is complete.

We have found in particular that when the pH of this decolorising system is between 8.5 and 9.5, then the dry fish protein isolate material subsequently obtained is capable of forming a gel when mixed with water, particularly when it is heated. Furthermore, it would appear that in order to form a gel, the pH of the decolorised fish protein isolate when mixed with water should also be alkaline.

In another example, hydrogen peroxide as the decolorising agent is used in conjunction with sodium hypochlorite. In this case, it is usual to contact the fish first with sodium hypochlorite by agitating the mixture, for example as a slurry, and then to add hydrogen peroxide and to continue agitation. It is preferable to warm the mixture to at least 35°C, but the temperature should not rise above 70°C, preferably not above 60°C, so as to minimise spontaneous thermal decomposition of hypochlorite.

The fish, preferably after the decolorising step, is deodorised by extraction with isopropanol. By this means, oils and fats having a tendency to autoxidise and thereby to impart an unpleasant taint to the isolated protein are removed.

This solvent extraction can conveniently be carried out by stirring the wet decolorised fish with isopropanol or with isopropanol mixed with water, preferably as an azeotropic mixture, and then separating the fish solids by filtration or by centrifugation. It is preferred to apply more than one such treatment with the solvent or to use a continuous countercurrent procedure in order to ensure complete removal of oils and fats that might give rise to taint.

Where there is a possibility that excess unreacted oxidising decolorising agent might remain in association with the decolorised fish protein isolate, a reducing agent such as ascorbate or sulphite or hypochlorite can be added in an amount which is sufficient to remove the excess decolorising agent. As an alternative, catalase can be used for the same purpose.

The fish protein isolate so prepared can be used as such in the moist state, for example as an additive for fish products, provided that the finished product for consumption contains less than the maximum level of isopropanol that is permitted by food additive regulations. If necessary, residual traces of this solvent can be removed by washing the fish protein isolate with water or by drying it, for example by vacuum drying. The dried fish protein isolate can, if required, be milled to a fine white powder for storage prior to subsequent use in human or animal foods. Alternatively, the dried solvent-free fish protein isolate can be used without milling, thereby retaining a proportion of fish muscle fibre bundles which enable the fish protein isolate to impart to a product formed from it a texture which more nearly resembles fish than when the corresponding milled fish protein isolate is used.

Fish protein isolate prepared according to the invention is particularly suitable for the refabrication of fish analogue products such as those described in our co-pending British patent application No 52154/71, or in the protein fortification of foodstuffs.

EXAMPLE 1

This Example illustrates the conversion of bone-free cod muscle obtained from filleting waste to high quality fish protein isolate powder.

A large batch of fresh cod filleting waste-consisting mainly of heads and frames, was obtained and bone was removed without prechopping by means of the Bibun DMM 15 deboning machine. The deboning machine employed had a drum aperture of 3 mm. The ash content of the deboned product was between 7 and 10 percent on a dry weight basis and the content of bone less than 1 percent. The content of true protein, as protein nitrogen×6.25 was between 80 and 90 percent on a dry weight basis.

6 kg of the resulting deboned flesh was heated to 50°C and maintained at that temperature during efficient maceration using the disintegrating head attachment of a Silverson mixer. As soon as a homogenous fluid consistency was obtained, the decolorising reagents were added and stirring was maintained.

300 ml of a solution of sodium hypochlorite, having 10–14 percent available chlorine, was added at the rate of 10 ml/sec; efficient stirring was necessary to eliminate local increases in viscosity. 120 ml. of 100 volume (30 percent) hydrogen peroxide was then added rapidly and the mixture maintained at 50°C with constant stirring for 60 minutes.

After cooling, the slurry was contacted with 18 litres of azeotropic isopropanol (9.75 percent water) and stirred for 1 hour at 25°–30°C.

The mixture was then centrifuged in a perforated basket centrifuge equipped with a nylon bag insert and the recovered solid was extracted twice more with 12 litres azeotropic isopropanol for 60 minutes at 70°C, with centrifugation after each extraction.

The final recovered solid was dried in a vacuum-drier at 2 mm Hg and 37°C bed temperature for 24 hours. 780 g of protein powder was obtained and subsequently ground to a particle size of less than 125 microns. The material was shown to have a protein efficiency ratio (PER) of 2.42 as compared with 2.01 for casein as a standard; this was 20 percent higher than that of casein. The method used for determination of the PER was that according to the Official Method of Analysis of the Association of Official Agricultural Chemists (Section 39.133, pages 785–786, 10th Edition).

The powder was white and when rehydrated appeared to match closely the colour of cooked cod muscle; it was stable when stored at room temperature for 12 months. The powder had the following analysis:

| | | |
|---|---|---|
| Protein | 90% | dry weight basis |
| Fat | 0.2% | dry weight basis |
| Ash | 4.5% | dry weight basis |
| Water | 4% | wet weight basis |
| Isopropanol | 1% | wet weight basis |

EXAMPLE 2

The procedure described in Example 1 was repeated except that the decolorised slurry of bone-free cod muscle was subjected to a batch countercurrent solvent extraction in a three stage process using a ratio of 3 litres isopropanol to 1 kg deboned fish flesh. The product obtained was similar to that described and defined in Example 1, except that it had a slightly higher fat content.

EXAMPLE 3

The procedure described in Example 1 was repeated except that prechopped cod offal was used as the starting material and the decolorising process step was modified in order to improve the whiteness of the end product. The procedure was as follows:

6 kg deboned cod flesh from prechopped filleting waste was heated to 60°C and macerated using the disintegrating head of a Silverson mixer until constant vortex stirring was obtained. 360 ml sodium hypochlorite solution (10-14 percent available chlorine) was added steadily over a 30 second time period; immediately afterwards 144 ml 100 volume (30 percent) hydrogen peroxide was added. The slurry was maintained at 60°C with constant stirring for 1 hour and then transferred while still hot to a vessel already containing 18 litres azeotropic isopropanol. Thereafter, the process was as described in Example 1.

EXAMPLE 4

This Example illustrates the conversion of bone-free cod muscle obtained from filleting waste to yield a high quality fish protein powder by employing an improved decolorising process and a countercurrent deodorising solvent extraction technique.

6 kg deboned cod flesh from prechopped filleting waste was heated to 60°C and macerated using the disintegrating head of a Silverson mixer until constant vortex stirring was obtained. 360 ml sodium hypochlorite solution (10-14 percent available chlorine) was added steadily over a 30 second time period; immediately afterwards, 144 ml 100 volume (30 percent) hydrogen peroxide was added. The slurry was maintained at 60°C with constant stirring for one hour and then subjected while still hot to a batch countercurrent solvent extraction in a three stage process using a ratio of 3 litres isopropanol to 1 kg deboned fish flesh. The decolorised deodorised product was dried to a faint cream coloured powder having the following composition:

| | | |
|---|---|---|
| Protein | 89.52% | dry weight basis |
| Ash | 6.85% | dry weight basis |
| Fat | 0.032% | dry weight basis |
| Volatiles (water and isopropanol) | 6.6% | wet weight basis |

The protein efficiency ratio of this sample was 2.31 compared with 2.49 for casein as a standard; this was 7 percent less than that of casein.

EXAMPLE 5

This Example describes a modification to that described in Example 1 in that a mild, alkaline peroxide decolorising procedure is used.

6 kg deboned cod filleting waste prepared from prechopped raw material was heated to 50°C as described in Example 1. To this macerate was added a solution of 28.8 g sodium hydroxide in 720 ml water with continual stirring to eliminate local changes in viscosity. The pH was 9.50.

216 ml 100 volume (30 percent) hydrogen peroxide was added and decoloration was observed to occur almost instantaneously; the reaction was allowed however to continue for 30 minutes to ensure adequate mixing.

The hot slurry was then transferred immediately to a vessel containing 18 litres of isopropanol for a three stage batch countercurrent solvent extraction with intermediate centrifugation as described in Example 2.

The dried white powder finally obtained was bland and totally free of fishy odours and gave the following analysis:

| | | |
|---|---|---|
| Protein | 87.81% | dry weight basis |
| Ash | 8.65% | dry weight basis |
| Fat | 0.032% | dry weight basis |
| Volatiles (water and isopropanol) | 5.9% | wet weight basis |

Protein efficiency ratio was 2.43 as compared with 2.49 for casein as a standard; this was 2 percent less than that of casein.

EXAMPLE 6

This Example illustrates the simultaneous decolorising and solvent extraction of deboned cod filleting waste.

6 kg bone-free cod flesh prepared from prechopped filleting waste was macerated thoroughly at 60°C, using the disintegrating head attachment of a Silverson mixer. 18 litres of azeotropic isopropanol was added and the mixture was reheated to 60°C with constant stirring.

360 ml sodium hypochlorite (10-14 percent available chlorine) was added during a 30 second time period, and followed immediately by 144 ml 100 volume (30 percent) hydrogen peroxide. The mixture was maintained at 60°C with constant stirring for 1 hour and was then centrifuged.

The resultant precipitate was extracted twice more with 2×12 litres azeotropic isopropanol at 75°C for 60 minutes, each extraction being terminated by centrifugation.

The final precipitate was dried under vacuum (2 mm Hg) for 24 hours at 37°C, to yield a product of identical appearance to that obtained in Example 4.

EXAMPLE 7

This Example illustrates the simultaneous decolorising and solvent extraction of whole fish.

8 kg whole cod was macerated thoroughly at 50°C and 18 litres azeotropic isopropanol added with constant stirring. The temperature was maintained at 50°C and the pH increased to 9.5 by the addition of 28.8 g sodium hydroxide in 720 ml water.

Stirring was maintained during the addition of 216 ml 100 volume (30 percent) hydrogen peroxide and then continued for 1 hour at 50°C.

The solids were separated by centrifugation and extracted twice more with 2×12 litres azeotropic isopropanol at 75°C for 1 hour, each extraction being terminated by centrifugation.

The final precipitate was dried under vacuum (2 mm Hg) for 24 hours at 37°C to yield a bland white powder having a protein efficiency ratio slightly better than that of casein as a standard.

The processes described in the foregoing Examples provide methods for preparing a decolorised fish protein isolate of high nutritional quality from fish or fish waste. Such methods depend on mild decolorising reagents and reaction conditions. Bone removal if employed is by mechanical means.

When prepared decolorised fish protein isolate from fish or fish waste using typical known methods, the nutritional quality of the product is, as we have stated, markedly inferior, as is shown in this experiment which uses a method similar to that proposed by Libenson and Pirosky referred to earlier.

1.6 kg minced cod filleting waste was treated with 7.6 litres water containing 22 g sodium hydroxide, and the mixture stirred and macerated using the disintegrating head attachment of a Silverson mixer, and heated. 410 ml 6 percent (20 volume) hydrogen peroxide was added at 30°C. The mixture was then heated to 50°C and maintained at that temperature for 15 minutes, with continual stirring. The pH was 10.5.

The mixture was then filtered to remove bone particles, and the filtrate cooled, and acidified to pH 4.8 by addition of 750 ml N-sulphuric acid.

The precipitated protein was collected by centrifugation and put through the isopropanol extraction and drying procedures as described in Example 1. The final powder was tested for nutritional quality, and gave a protein efficiency ratio of 1.21, compared with the casein control value of 2.01.

Therefore this known process gives a PER of only half that shown in Example 1, and 40 percent less than that of casein. It is therefore unsuitable as a replacement or extender for animal protein for human consumption.

What is claimed is:

1. The process for isolating protein from fish, which comprises the steps of:
  i. removing bone from raw fish by a mechanical operation to provide a substantially bone-free raw fish having a protein efficiency ratio equivalent to that of the raw fish starting material,
  ii. thereafter decolorizing the bone-free raw fish at a pH value of from mildly alkaline to about 9.5 by mixing it with an alkali and with hydrogen peroxide at a temperature of from about 40° to about 60°C.
  iii. thereafter deodorizing the decolorized bone-free fish by extraction with isopropanol to provide a bone-free essentially white fish protein isolate, and
  iv. subsequently drying the isolate.

2. The process of claim 1, wherein said substantially bone-free raw fish contains less than one percent bone.

3. The process of claim 1, wherein the decolorising of the protein is carried out at a pH between about 8.5 and about 9.5.

4. The process of claim 1, additionally comprising the step of removing excess decolorising agent from the decolorised fish by treatment with catalase.

5. The process of claim 1, additionally comprising the step of removing excess decolorising agent from the decolorised fish by treatment with a reducing agent selected from the group consisting of ascorbate, sulphite, and hypochlorite.

6. A process for isolating protein from fish, which comprises the steps of:
  i. subdividing the raw fish by mincing or by milling it,
  ii. thereafter decolorising the subdivided fish at a pH value from about 7.0 to about 9.5 by mixing it with an alkali and with hydrogen peroxide at a temperature from about 40° to about 60°C,
  iii. thereafter deodorising the decolorised subdivided fish by extraction with isopropanol to provide an essentially white fish protein isolate, and
  iv. subsequently drying the isolate.

* * * * *

UNITED STATES PATENT AND TRADEMARK OFFICE
CERTIFICATE OF CORRECTION

PATENT NO. : 3,879,370
DATED : April 22, 1975
INVENTOR(S) : Roland Paul Carpenter et al.

It is certified that error appears in the above-identified patent and that said Letters Patent are hereby corrected as shown below:

Change "Assignee: Lever Brothers Company, New York, N.Y." to -- Assignee by mesne assignments Astra Nutrition AB, Mölndal, Sweden --.

Signed and Sealed this twenty-sixth Day of August 1975

[SEAL]

Attest:

RUTH C. MASON
*Attesting Officer*

C. MARSHALL DANN
*Commissioner of Patents and Trademarks*